April 28, 1925.
J. JÁRFÁS, JR
1,535,419
FASTENING MEANS FOR SEED PLANTER ATTACHMENTS FOR WHEELED PLOWS
Filed Jan. 9, 1924
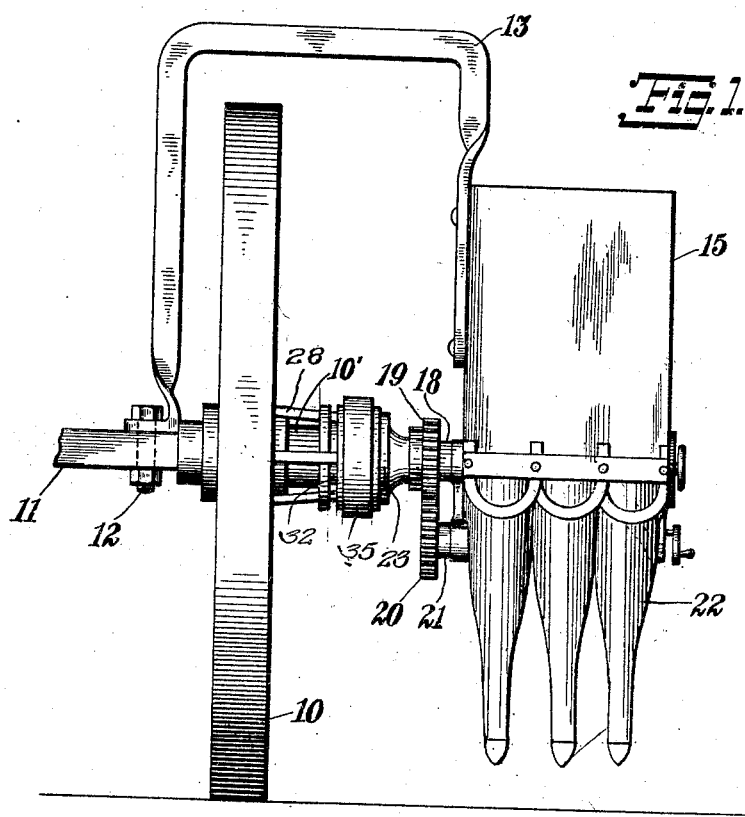
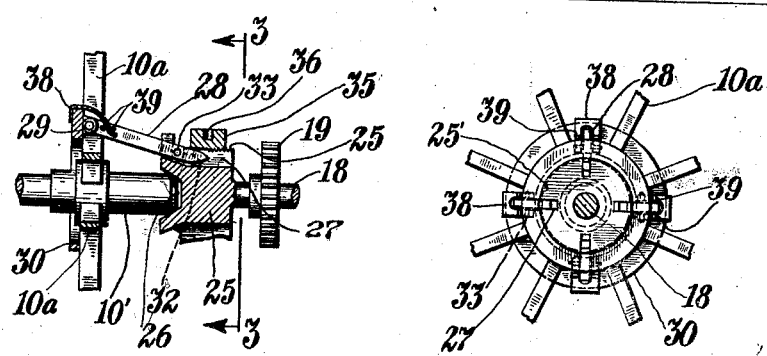
Inventor
Jozsef Járfás, Jr.
By
Attorney Patented Apr. 28, 1925.

1,535,419

UNITED STATES PATENT OFFICE.

JOZSEF JÁRFÁS, JR., OF BUSSU, HUNGARY, ASSIGNOR OF ONE-HALF TO ROZINA PÁPAY, OF WINNIPEG, MANITOBA, CANADA.

FASTENING MEANS FOR SEED-PLANTER ATTACHMENTS FOR WHEELED PLOWS.

Application filed January 9, 1924. Serial No. 685,140.

*To all whom it may concern:*

Be it known that I, JOZSEF JÁRFÁS, Jr., a subject of Hungary, residing at Bussu, in the county of Somogy and Kingdom of Hungary, have invented certain new and useful Improvements in Fastening Means for Seed-Planter Attachments for Wheeled Plows, of which the following is a specification.

This invention relates to a seed planter adapted to be used as an attachment to an ordinary wheeled plow, the invention having for an object to provide a novel means for attaching a seed planter beside one of the plow wheels to have its seed discharging means operated by said wheel.

For further comprehension of the invention, and of the objects and advantages thereof, reference will be had to the following description and accompanying drawings, and to the appended claims in which the various novel features of the invention are more particularly set forth.

Fig. 1 of the drawings is a rear elevational view showing a seed planter operatively engaged with one of the wheels of a plow by my improved means.

Fig. 2 is a fragmentary transverse section showing a modified means for securing the planter in place.

Fig. 3 is a sectional view at right angles to Fig. 2 and taken on the line 3—3 thereof.

In Fig. 1 of the drawings the reference number 10 indicates a wheel which may be one of a pair used to support the beam of a plow, or which may form part of the running gear of some other agricultural implement, a portion of the supporting axle being indicated at 11. To this axle is bolted as at 12 one end of a U-shaped strap 13 which straddles the upper half of the wheel. The other end of this strap is bolted or otherwise fastened to the side of a hopper 15 adapted to contain the seed to be planted, the strap 13 being of sufficient rigidity to properly brace and support the hopper.

The wheel 10 is formed with a projecting hub member 10′ of cylindrical form and is operatively engaged by means to be presently described, with one end of a shaft 18 on which is a gear 19, the other end of the shaft being supported by the hopper walls. Gear 19 meshes with a like gear 20 on a second shaft 21 which operates the seed discharging means, which may be of usual construction, the seed being discharged through the chutes 22.

Fixed on the shaft 18 is a disk-like head 25 having a tapering socket 26 in which the hub element engages. The periphery of this head is formed with a series of longitudinal slots 27 in which are received the free ends of arms 28 pivoted at their other ends to lugs 29 formed on a ring 30 which surrounds the hub of the wheel just inside the spokes 10ᵃ and bears against the latter. Formed in the head 25 is a circumferential groove 32 to receive pins 33 carried by the arms 28. The outer end of the head 25 is screw threaded as at 25′ and has threaded thereon a circular nut 35 which may be provided with a socket such as 36 to receive a spanner tip. The ring 30 may have mounted thereon adjacent each arm 28 a flat spring 38 having a bifurcated end which straddles the arm and engages between a pair of pins 39 in said arm, these springs serving to normally hold the arms in substantially the inclined position shown in Fig. 2.

In mounting this device in place the nut 35 is first threaded outwardly, the head 25 is then fitted to the hub element 10′ and the ring 30, which may be a split ring, is positioned against the spokes 10ᵃ with the arms 28 engaged in the slots 27. In this position the arms incline, toward one another, while the pins 33 engage the inner walls of the groove 32. It will be apparent then that when the arms 28 are forced inwardly the engagement of the pins 33 with said wall will draw the ring 30 and head 25 toward one another. This is accomplished by threading the nut 35 forward, causing it to bear on the inclined arms 28 as indicated in Fig. 2 of the drawing, thus firmly clamping the head 25, and with it shaft 18, to the hub element 10′.

Having thus described my invention what I claim as new and desire to protect by Letters Patent of the United States is as follows:—

1. In a device of the class described comprising, a shaft adapted to operate seed distributing devices, and means whereby said shaft may be operatively engaged with the hub element of a running wheel to be rotated by the latter, said means comprising a disk-like head adapted to engage the said hub element, said head having a number of axial slots and a groove in its periphery, a series of inclined arms adapted for pivotal mounting on a wheel, said arms having their free ends engaging in said slots and having pins engaging in said groove, and a nut threaded on said head and adapted to press the free ends of said arms radially inward.

2. In a device of the class described comprising, a shaft adapted to operate seed distributing devices, and means whereby said shaft may be operatively engaged with the hub element of a running wheel to be rotated by the latter, said means comprising a disk-like head adapted to engage the said hub element, said head having a number of axial slots and a peripheral groove in its periphery, a series of inclined arms adapted for pivotal mounting on a wheel, said arms having their free ends engaging in said slots and having pins engaging in said groove, and a nut threaded on said head and adapted to press the free ends of said arms radially inward, and springs engaging said arms and normally retaining the same in inclined position.

In testimony whereof I have affixed my signature.

JOZSEF JÁRFÁS, Jr.